(12) United States Patent
Jarisch et al.

(10) Patent No.: US 11,148,876 B2
(45) Date of Patent: Oct. 19, 2021

(54) SUPPORT AND CAPSULE FOR PREPARING A BEVERAGE BY CENTRIFUGATION, SYSTEM AND METHOD FOR PREPARING A BEVERAGE BY CENTRIFUGATION

(71) Applicant: NESTEC S.A., Vevey (CH)

(72) Inventors: Christian Jarisch, Lutry (CH); Alexandre Perentes, Lausanne (CH); Stefan Kaeser, Aarau (CH); Carlo Magri, Monthey (CH); Arnaud Gerbaulet, Oye et Pallet (FR); Thomas Kaeser, Brent (CH); Daniel Abegglen, Rances (CH)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 16/785,903

(22) Filed: Feb. 10, 2020

(65) Prior Publication Data

US 2020/0172324 A1 Jun. 4, 2020

Related U.S. Application Data

(62) Division of application No. 15/397,218, filed on Jan. 3, 2017, now abandoned, which is a division of
(Continued)

(30) Foreign Application Priority Data

May 12, 2010 (EP) .................................... 10162741
Jul. 13, 2010 (EP) .................................... 10169374

(51) Int. Cl.
*A47J 31/22* (2006.01)
*B65D 85/804* (2006.01)
(Continued)

(52) U.S. Cl.
CPC ............ *B65D 85/8043* (2013.01); *A23L 2/38* (2013.01); *A47J 31/22* (2013.01); *A47J 31/4492* (2013.01);
(Continued)

(58) Field of Classification Search
CPC ... A47J 31/22; A47J 31/4492; B65D 85/8043; B65D 25/205; B65D 2203/06;
(Continued)

(56) References Cited

U.S. PATENT DOCUMENTS 2,612,994 A  10/1952 Woodland
3,501,896 A   3/1970 Von Stoeser et al.
(Continued)

FOREIGN PATENT DOCUMENTS

DE   3432339    3/1986
EP   0455337   11/1991
(Continued)

OTHER PUBLICATIONS

PCT International Search Report for Application No. PCT/EP2011/057670 dated Aug. 25, 2011; 4 pages.
(Continued)

*Primary Examiner* — Reginald Alexander
(74) *Attorney, Agent, or Firm* — K&L Gates LLP (57) ABSTRACT

A capsule for the preparation of a beverage can include a container and a beverage ingredient contained therein. The container can include at least one support having a section on which a plurality of sequences of symbols is represented; each symbol is sequentially readable, by a reading arrangement of an external device, while the capsule is rotated along an axis of rotation. Each sequence can code a set of information related to the capsule, and at least one of the sequences can include symbols defining a preamble sequence that allows determination of a position of the
(Continued)

symbols in the associated sequence coding the set of information related to the capsule. The container can include a cup-shaped body having a flange-like rim and a lid connected to the body, the support can be on a bottom of the rim, and the bottom of the rim can be opposed to the lid.

17 Claims, 5 Drawing Sheets

Related U.S. Application Data application No. 13/697,303, filed as application No. PCT/EP2011/057670 on May 12, 2011, now abandoned.

(51) Int. Cl.
    *A47J 31/44*     (2006.01)
    *A23L 2/38*     (2021.01)
    *G06K 19/00*     (2006.01)
    *B65D 25/20*     (2006.01)
    *G06K 19/06*     (2006.01)

(52) U.S. Cl.
    CPC .......... *B65D 25/205* (2013.01); *G06K 19/00* (2013.01); *G06K 19/0614* (2013.01); *G06K 19/06018* (2013.01); *B65D 2203/06* (2013.01); *Y02W 90/10* (2015.05)

(58) Field of Classification Search
    CPC ...... A23L 2/38; G01K 19/00; G01K 19/0614; G01K 19/06018; G01K 7/10821
    USPC .......................................................... 99/295
    See application file for complete search history.

(56) References Cited

U.S. PATENT DOCUMENTS

| | | | |
|---|---|---|---|
| 3,636,317 A | 1/1972 | Torrey | |
| 4,250,405 A | 2/1981 | Ashcroft et al. | |
| 5,028,769 A | 7/1991 | Claypool | |
| 5,243,164 A | 9/1993 | Erickson et al. | |
| 5,285,041 A | 2/1994 | Wright | |
| 5,479,515 A | 12/1995 | Longacre | |
| 6,112,981 A | 5/2000 | McCall | |
| 6,527,181 B1 | 3/2003 | Kleeberg et al. | |
| 6,698,333 B2 | 3/2004 | Halliday et al. | |
| 7,444,925 B2 * | 11/2008 | Mahlich ............... | A47J 31/3623 99/289 P |
| 7,607,385 B2 | 10/2009 | Halliday et al. | |
| 2002/0014531 A1 | 2/2002 | Murphy | |
| 2002/0030713 A1 | 3/2002 | Silverbrook | |
| 2002/0048261 A1 | 4/2002 | Brioschi et al. | |
| 2002/0048621 A1 | 4/2002 | Boyd et al. | |
| 2002/0148356 A1 | 10/2002 | Lazaris | |
| 2004/0005384 A1 | 1/2004 | Cai | |
| 2004/0153649 A1 | 8/2004 | Rhoads | |
| 2004/0206245 A1 | 10/2004 | Halliday | |
| 2010/0078480 A1 | 4/2010 | Aker | |

FOREIGN PATENT DOCUMENTS

| | | | | |
|---|---|---|---|---|
| EP | 0638486 | | 10/1996 | |
| EP | 1344722 | | 9/2003 | |
| EP | 1529739 | | 5/2005 | |
| EP | 1764015 | | 3/2007 | |
| EP | 1849718 | | 10/2007 | |
| EP | 1772398 | | 11/2007 | |
| EP | 2000062 A1 | * | 12/2008 | ............. A47J 31/22 |
| EP | 1629752 B9 | | 3/2010 | |
| EP | 2957525 | | 7/2011 | |
| EP | 2012994 | | 7/2012 | |
| JP | 6248878 | | 10/1987 | |
| JP | 02180073 | | 8/1990 | |
| JP | 2000094838 | | 4/2000 | |
| JP | 2003235733 | | 8/2003 | |
| JP | 2007257439 | | 10/2007 | |
| WO | 0160712 | | 8/2001 | |
| WO | 0199047 | | 12/2001 | |
| WO | 0228241 | | 4/2002 | |
| WO | 2005044067 | | 5/2005 | |
| WO | 2005047111 | | 5/2005 | |
| WO | 2008134910 | | 11/2008 | |
| WO | 2010026053 | | 3/2010 | |
| WO | 2010041179 | | 4/2010 | |
| WO | 2011047836 | | 4/2011 | |
| WO | 2011141532 | | 11/2011 | |
| WO | 2012010317 | | 1/2012 | |

OTHER PUBLICATIONS

Written Opinion of the PCT International Search Report for Application No. PCT/EP2011/057670 dated Aug. 25, 2011; 6 pages.
Barcode Dictionary, American Barcode, Feb. 13, 2002. Retrieved from the Internet URL: <http://web.archive.org/web/20020213015340/http://www.amerbar.com/university/dictionary.asp>.
A Short introduction to Barcodes. The Barcode Software Center. Jan. 31, 2009. Retrieved from the Internet Archive URL: <http://web.archive.org/web/20090131180522/http://makebarcode.com/info/intro.html>.
Barcode Scanner World Glossary. Aug. 1, 2009. Retrieved from the Internet Archive URL: <http://web.archive.org/web/20090801090238/http://www.retailerwarehouse.com/Barcode-Scanner-World-Glossary-s/227.html>.
Carolina Barcode, How Barcode Scanners Work. May 10, 2008. Retrieved from Internet Archive URL: <http://webarchive.org/web/20080510134731/http://carolinabarcode.com/how-barcode-scanners-work-a-69.html>.
Hacking the Tassimo Single Serve Coffee Machine. Nov. 29, 2007. Retrieved from the Internet URL: <http://blog.chapmanconsulting.ca/post/2007/11/29/Hacking-The-Tassimo-single-serve-coffee-machine.aspx.>.
WO 2005044067 Espacenet Machine Translation.

\* cited by examiner

SUPPORT AND CAPSULE FOR PREPARING A BEVERAGE BY CENTRIFUGATION, SYSTEM AND METHOD FOR PREPARING A BEVERAGE BY CENTRIFUGATION

PRIORITY CLAIM

The present application is a divisional of U.S. patent application Ser. No. 15/397,218, filed on Jan. 3, 2017, which is a divisional of U.S. patent application Ser. No. 13/697,303 filed on Nov. 9, 2012, which is a National Stage of International Application No. PCT/EP2011/057670 filed on May 12, 2011, which claims priority to European Patent Application No. 10162741.2 filed on May 12, 2010 and European Patent Application No. 10169374.5 filed on Jul. 13, 2010, the entire contents of which are incorporated herein by reference.

FIELD OF THE INVENTION

The invention pertains to the field of the beverage preparation machines, in particular using capsules containing an ingredient for preparing a beverage. The present invention relates in particular to coding supports adapted to store information related to a capsule, capsules associated with/or embedding coding supports, reading and processing arrangements for reading and using such information for preparing a beverage.

For the purpose of the present description, a "beverage" is meant to include any human consumable liquid substance, such as coffee, tea, hot or cold chocolate, milk, soup, baby food or the like. A "capsule" is meant to include any pre-portioned beverage ingredient or combination of ingredients (hereafter called "ingredient") within an enclosing packaging of any suitable material such as plastic, aluminum, a recyclable and/or bio-degradable material and combinations thereof, including a soft pod or a rigid cartridge containing the ingredient.

BACKGROUND

Certain beverage preparation machines use capsules containing an ingredient to be extracted or to be dissolved and/or an ingredient that is stored and dosed automatically in the machine or else is added at the time of preparation of the drink. Some beverage machines possess liquid filling means that include a pump for liquid, usually water, which pumps the liquid from a source of water that is cold or indeed heated through heating means, e.g. a thermoblock or the like. Certain beverage preparation machines are arranged to prepare beverages by using a centrifugational extraction process. The principle mainly consists in providing beverage ingredient in a container of the capsule, feeding liquid in the receptacle and rotating the receptacle at elevated speed to ensure interaction of liquid with powder while creating a gradient of pressure of liquid in the receptacle; such pressure increasing gradually from the center towards the periphery of the receptacle. As liquid traverses the coffee bed, extraction of the coffee compounds takes place and a liquid extract is obtained that flows out at the periphery of the receptacle.

Identifying a capsule may be desirable, for instance, to control parameters in the beverage preparation device such as liquid or beverage flow rate, pressure, rotational speed, temperature and combinations thereof EP0451980 relates to packages containing comestibles for the preparation of beverages. Recognition means can comprise one or more strips of a magnetic material applied to the body of the package which can be read by an appropriate magnetic sensor, one or more shaped or divided areas of metal foil applied to the package body which cause an inductive effect on movement of the package in the machine, which inductive effect can be sensed; or one or more electrically conductive areas formed on the body of the package which can be sensed electrically.

WO02/28241 relates to an encoded coffee packet for use in the preparation of hot or cold beverages comprising a filter defining a cavity and a brewing ingredient within the cavity. The packet further comprises a machine-interpretable feature located on the filter such as a color, a shape, a glyph, a text string, a barcode or a digital watermark.

WO02/078498 relates to a machine-readable identifier on a portion package which contains ground coffee for espresso machine. The identifier can be a concentric barcode which is read when the capsule turns around an axis which is placed outside of its perimeter such as when the capsule is stored in a carousel.

WO2005044067 relates to a system for identifying a capsule having a code visible under UV light printed thereon or a magnetic code such as a ribbon or label. The code may be read by a turning magnetic reading head. However, such system is not adapted for detecting a capsule in a device using centrifugal forces for extracting the beverage.

WO2009007292 relates to a method for reading barcodes in a drinks machine when the brewing chamber is being closed from an open position to a closed position.

WO2010/026053 relates to a controlled beverage production device using centrifugal forces. The capsule may comprise a barcode provided on an outside face of the capsule and which enables a detection of the type of capsule and/or the nature of ingredients provided within the capsule in order to apply a predefined extraction profile for the beverage to be prepared.

A problem with identifying a capsule in a beverage preparation machine is that the retrieving or reading information from the capsule is not always reliable or convenient. Moreover, the space available in the machine dedicated to the sensing device for reading this information may be quite limited, rendering the reading of a relatively high amount of data difficult. The present invention brings solutions to these problems.

BRIEF DESCRIPTION OF THE INVENTION

An object of the invention is to provide means for storing, reading and processing information related to a capsule, more particularly information for identifying said capsule within a production machine and for retrieving or reading information for adjusting working parameters of the machine and/or for controlling parameters for preparing a beverage with said capsule.

Another object is to control optimal conditions for preparing a beverage.

Another object is to provide a solution for reliably reading information related to a capsule with a sensor disposed in the machine, for example in the processing module/brewing unit of the machine, where available spaces are quite limited and in a harsh environment (ingredients traces, presence of vapors and liquids, . . . ).

One or more of these objects are met by a support, a capsule, a device or a method according to the independent claim(s). The dependent claims further provide solutions to these objects and/or additional benefits.

More particularly, according to a first aspect, the invention relates to a support adapted to be associated with, or part of, a capsule for the preparation of a beverage. The support comprises a section on which at least one sequence of symbols is represented so as that each symbol is sequentially readable, by a reading arrangement of an external device, while the capsule is driven in rotation along an axis of rotation, each sequence coding a set of information related to the capsule. The external device may be embedded into the processing module/brewing unit of the machine. By providing sequentially readable symbols while the capsule is driven in rotation, the amount of coded data may be raised and/or the area covered by each symbol may be enlarged, improving the overall reliability of the readings. By "sequentially" it should be understood that one or a limited number of symbols (less than the number of symbols comprised in each sequence) are read at a given time: for instance, each symbol can be read separately, or depending on the capacities of the reading arrangement, a plurality of symbols can be read at time, for example 3 symbols at time for a sequence comprising 36 symbols. As a consequence, at least one reading of all the symbols included in all the sequences in the support can be performed by the reading arrangement after a 360 degrees rotation of the capsule around its axis of rotation.

In an embodiment, the support can be a part of the capsule itself. In particular, the support may be spread along the circumference or a part of the circumference of the capsule. The support can be further located close to the peripheral edge of the capsule, the peripheral edge being defined as the outermost circular line of the capsule. These locations are particularly advantageous since they offer both a large area for the symbols to be disposed and are less prone to damages caused by the processing module and in particular by the pyramidal plate, and to ingredients projections. As a consequence, the amount of coded information and the reliability of the readings are both improved.

The support can be part of or be formed directly on, the body of the capsule. The support can also be disposed on the bottom side of the rim of the capsule. Typically, the distance of the support from the peripheral edge is not more than 10 mm, more preferably not more than 8 mm. In particular, the support can be made of a paint and/or a lacquer and/or an embossed ply of material of the capsule itself.

In an embodiment, the support can be a separate part adapted to be coupled in rotation with a capsule. For instance, the support can be a ring having a circumferential part on which the at least one sequence of symbols is represented, so as the user can positioned said ring on the circumference of the capsule before introducing it into the brewing unit of the beverage machine Consequently, a capsule without embedded means for storing information can be modified by mounting such a support so as to add such information. Depending on the configuration of the reading arrangement, the support can be positioned so as the section containing the sequence of symbols is spread along the circumference or a part of the circumference of the body of the capsule, or on the bottom side of the rim of the capsule. The support may be simply disposed relatively to the capsule without additional fixing means, the user ensuring that the support is correctly positioned when entering the brewing unit, or the forms and the dimensions of the support preventing it from moving relatively to the capsule once mounted. Alternatively, the support may comprise fixing means, like glue or mechanical means, to help the support staying fixed relatively to the capsule once mounted.

In particular, the set of information of at least one of the sequences may comprise information for recognizing a type associated to the capsule, and/or one or a combination of items of the following list:
- information related to parameters for preparing a beverage with the capsule, such as the optimal rotational speeds, temperatures of the water entering the capsule, temperatures of the collector of the beverage outside the capsule, flow rates of the water entering the capsule, sequence of operations during the preparation process, etc;
- information for retrieving locally and/or remotely parameters for preparing a beverage with the capsule, for example an identifier allowing the recognition of a type for the capsule;
- information related to the manufacturing of the capsule, such a production batch identifier, a date of production, a recommended date of consumption, an expiration date, etc;
- information for retrieving locally and/or remotely information related to the manufacturing of the capsule.

Each set of information of at least one of the sequences may comprise redundant information. Hence, error-checking may be performed by comparison. It also improves by the way the probability of a successful reading of the sequence, should some parts of the sequence be unreadable. The set of information of at least one of the sequences may also comprises information for detecting errors, and/or for correcting errors in said set of information. Information for detecting errors may comprise repetition codes, parity bits, checksums, cyclic redundancy checks, cryptographic hash function data, etc. Information for correcting errors may comprise error-correcting codes, forward error correction codes, and in particular, convolutional codes or block codes.

The symbols arranged in sequences are used to represent data conveying the set of information related to the capsule. For instance, each sequence may represent an integer number of bits. Each symbol may encode one or several binary bits. The data may also be represented by transitions between symbols. The symbols may be arranged in the sequence using a modulation scheme, for example a line coding like a Manchester coding.

Each symbol may be represented in the section by an entity having a measurable characteristic, readable by the measuring arrangement, the measurable characteristic varying according to the value conveyed by said symbol. Each symbol may be printed and/or embossed. The shape of the symbols may be chosen amongst the following non-exhaustive list: arch-shaped segments, segments which are individually rectilinear but extend along at least a part of the section, dots, polygons, geometric shapes. The symbols may be readable by an optical sensor included in the reading arrangement, the color and/or the shape of each symbol being chosen according to the value of said symbol. The symbols may be printed by an ink which is not visible by human eyes under natural light e.g., ink visible under UV. The symbols may be printed or embossed by a pattern which possesses surfaces having different reflective and/or absorbing properties to light. The pattern may possesses first surfaces having inclined mirroring or absorbing properties to light and second surfaces having flat minoring or flat reflective properties to light. Other variable physical characteristics may be chosen to distinguish each symbol, for example the color, the reflectivity, the opacity, the light absorption level, the magnetic field, the induced magnetic field, the resistivity, the capacity, etc. For instance, the sequence can be composed with four different symbols coding respectively one of the four set of data '00', '01', '10', '11', each symbol having the shape of a dot or a square, and a black color or a 25% gray color. In this example, a black dot may code '00', a gray dot '01', a black square '10', a gray square to '11'.

In an embodiment, each sequence of symbols has a same fixed length, and more particularly has a fixed number of symbols. The structure of the sequence being known, it may ease the recognition of each sequence by the reading arrangement.

In an embodiment, at least one preamble symbol is represented in the section, so as to allow the determination of a start and/or a stop position in the section of each sequence. The preamble symbol is chosen to be identified separately from the other symbols. It may have a different shape and/or physical characteristics compared with the other symbols. Two adjacent sequences may have a common preamble symbol, representing the stop of one sequence and the start of the other one.

In an embodiment, at least one of the sequences comprises symbols defining a preamble sequence, so as to allow the determination of a position of the symbols in said sequence coding the set of information related to the capsule. The symbols defining a preamble may code a known reserved sequence of bits, for example '10101010'.

In an embodiment, the preamble symbols and/or the preamble sequences comprise information for authentifying the set of information, for example a hash code or a cryptographic signature.

The reading arrangement may be configured to read sequentially the symbols, i.e. to read a limited subset of symbols separately, the entire sequence of symbols being readable by the reading arrangement with the complete rotation of the capsule. For instance, the reading arrangement may be configured to read one symbol at time, the symbols being spread along at least a eighth, preferably at least a quarter of the circumference of the capsule or even more. This configuration allows improving the reliability of the readings since reading one symbol at time are easier, more reliable and generates less reading errors than readings the whole sequence at time. Moreover, the symbols being placed on a capsule along an arc-shaped line, the reading by a sweep beam may be not appropriate, considering the limited available space in the extraction chamber, the large area to read and the expected reliability. The rotation of the capsule allows reading each symbol sequentially, without having to displace the sensor or its reading area.

According to a second aspect, the invention relates to a capsule for the preparation of a beverage comprising a container and a beverage ingredient contained therein, wherein the container comprises at least one support according to the first aspect.

The capsule may have a circumference, wherein the section is arranged on the container along 10 an arc-shaped or circular path of the circumference. Each sequence may be arranged along at least a eighth of the circumference.

The container comprises for example a body and a lid connected to the body and wherein the section of the support is present on the lid of the container.

The section of the support may be present on the rim of the capsule, in particular, on the bottom of the rim of the capsule which is opposed to the lid or foil of the capsule.

According to a third aspect, the invention relates to a system for preparing a beverage from a capsule according to the second aspect or a combination of a capsule and a support according to the first aspect, and further comprising a beverage preparation device. The device comprises capsule holding means for holding the capsule and rotational drive means for driving the holding means and capsule in rotation along said axis of rotation and reading means arranged for reading the sequences of symbols in the section when the capsule is rotated along said axis. The reading means may comprise a light emitter and a light sensor or an inductive sensor. The optical reading means or inductive sensor may be arranged to read the sequences on the rim of the capsule.

According to a fourth aspect, the invention relates to a method for preparing a beverage from a system according to the third aspect, wherein the beverage is extracted from the capsule by rotating the capsule along said axis. The sequences may be read at a first rotational speed and the beverage may be extracted from the capsule at a second rotational speed.

BRIEF DESCRIPTION OF THE FIGURES

The present invention will be better understood thanks to the detailed description which follows and the accompanying drawings, which are given as non-limiting examples of embodiments of the invention, namely.

DETAILED DESCRIPTION

Figure 1:
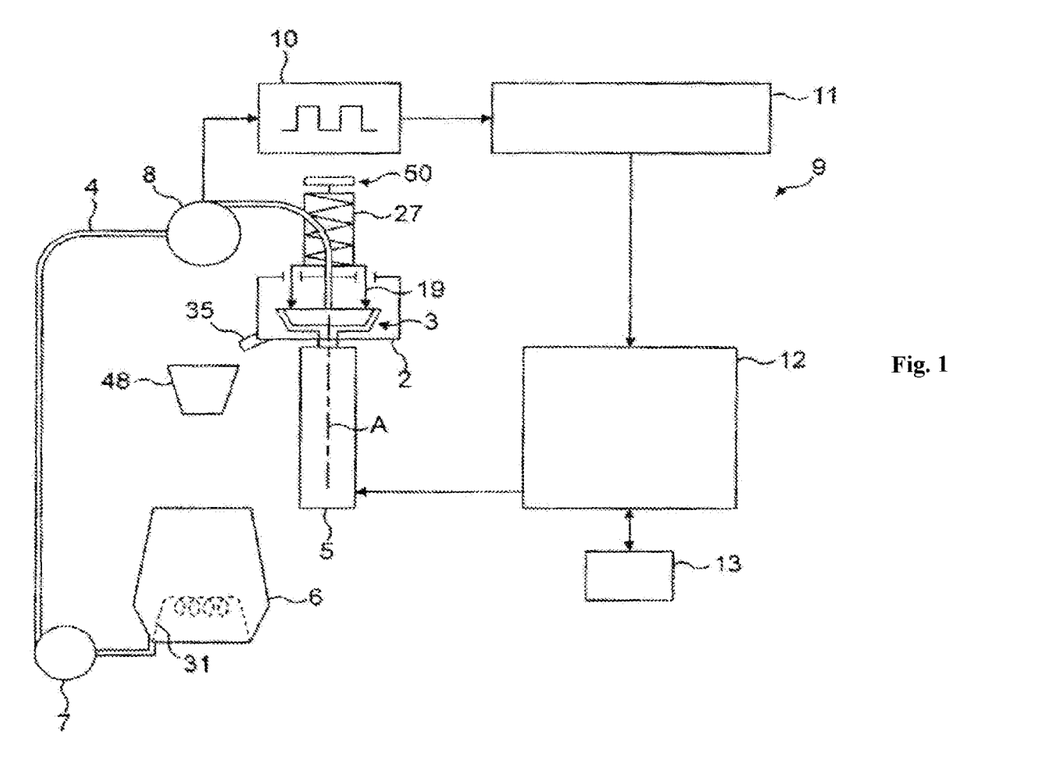
FIG. 1 illustrates the basic principle of the centrifugal extraction.

FIG. 1 illustrates an example of a beverage preparation system 1 as described in WO2010/026053 for which the capsule of the invention can be used.

The centrifugal unit 2 comprises a centrifugal cell 3. The cell 3 may comprise a capsule holder and a capsule received therein. The centrifugal unit is connected to driving means 5 such as a rotary motor. The centrifugal unit comprises a collecting part and an outlet 35. A receptacle 48 can be disposed below the outlet to collect the extracted beverage. The system further comprises liquid supply means such as a water reservoir 6 and a fluid circuit 4. Heating means 31 may also be provided in the reservoir or along the fluid circuit. The liquid supply means may further comprise a pump 7 connected to the reservoir. A flow restriction means 19 is provided to create a restriction to the flow of the centrifuged liquid which leaves the capsule. The system may further comprise a flow meter such as a flow-metering turbine 8 for providing a control of the flow rate of water supplied in the cell 3. The counter 11 can be connected to the flow-metering turbine 8 to enable an analysis of the generated impulse data 10. The analyzed data is then transferred to the processor 12. Accordingly, the exact actual flow rate of the liquid within the fluid circuit 4 can be calculated in real-time. A user interface 13 may be provided to allow the user to input information that is transmitted to the control unit 9. Further characteristics of the system can be found in WO2010/026053.

In the following examples (see FIG. 5), the capsule comprises a cup-shaped body 69 extending by a flange-like rim 73. A lid such as a foil or membrane (liquid-tight or permeable to liquid) 60 is connected to the body, e.g., sealed on the rim. The capsule is filled with beverage ingredient such as ground coffee.

Figure 5:
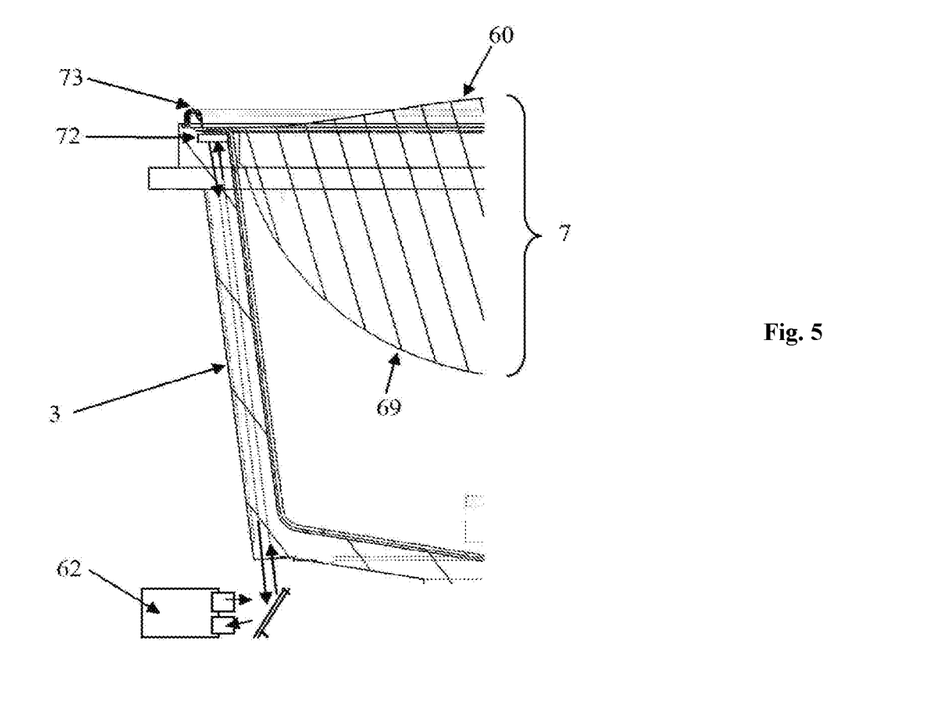
FIG. 5 illustrates an alternate position of the sequence on the capsule, in particular, when placed on the underside of the rim of the capsule, and the capsule fitted into a capsule holder of the extraction device.

The capsule is designed for rotating around an axis A. This axis A crosses perpendicularly the center of the membrane which has the form of a disk. This axis A exits at the center of the bottom of the body. This axis A will help to define the notion of "circumference" which is a circular path located on the capsule and having the axis A as reference axis. This circumference can be on the lid, e.g., membrane or on the body part such as on the flange-like rim. The lid may be impervious to liquid before insertion in the device or it may be pervious to liquid by means of small openings or pores provided in the center and/or periphery of the lid.

Figure 2:
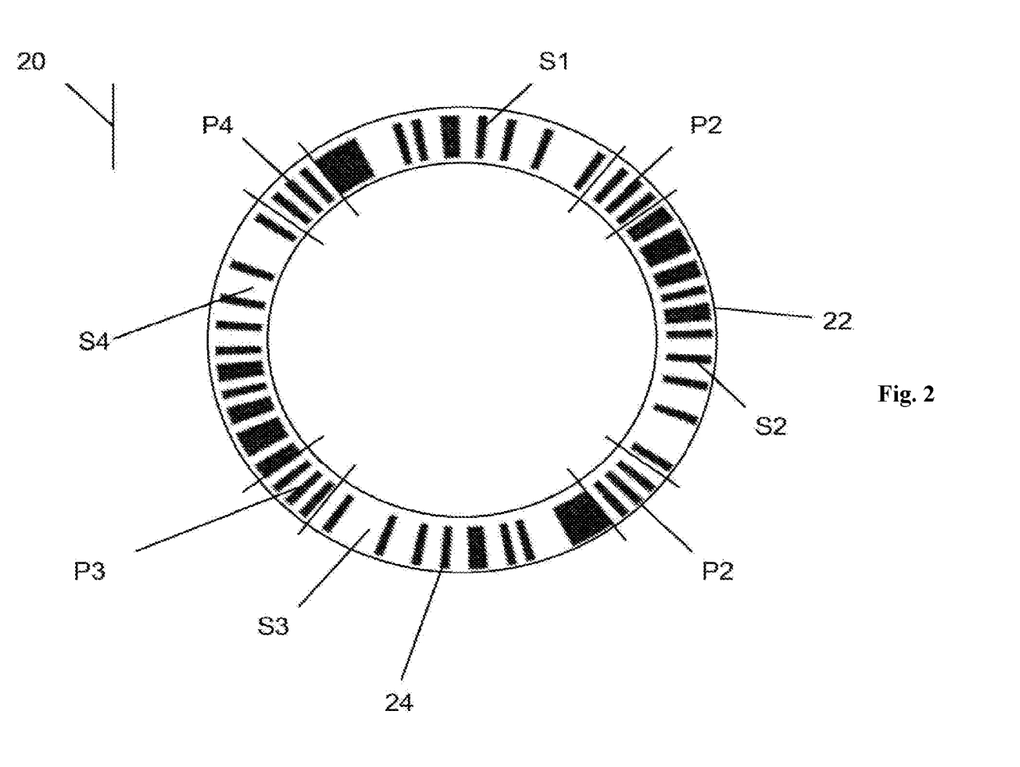
FIG. 2 illustrates a support according to the invention.

Referring to FIG. 2, a support 20 is illustrated. The support 20 is adapted to be associated with, or be a part of, a capsule for the preparation of a beverage. The support 20 comprises a section 22 on which at least one sequence S1, S2, S3, S4 of symbols 24 is represented so as that each symbol is sequentially readable, by a reading arrangement of an external device, while the capsule is driven in rotation along the axis A of rotation, each sequence coding a set of information related to the capsule. In particular, the set of information of at least one of the sequences may comprise information for recognizing a type associated to the capsule, and/or one or a combination of items of the following list:

- information related to parameters for preparing a beverage with the capsule, such as the optimal rotational speeds, temperatures of the water entering the capsule, temperatures of the collector of the beverage outside the capsule, flow rates of the water entering the capsule, sequence of operations during the preparation process, etc;
- information for retrieving locally and/or remotely parameters for preparing a beverage with the capsule, for example an identifier allowing the recognition of a type for the capsule;
- information related to the manufacturing of the capsule, such a production batch identifier, a date of production, a recommended date of consumption, an expiration date, etc;
- information for retrieving locally and/or remotely information related to the manufacturing of the capsule.

Each set of information of at least one of the sequences may comprise redundant information. Hence, error-checking may be performed by comparison. It also improves by the way the probability of a successful reading of the sequence, should some parts of the sequence be unreadable. The set of information of at least one of the sequences may also comprises information for detecting errors, and/or for correcting errors in said set of information. Information for detecting errors may comprise repetition codes, parity bits, checksums, cyclic redundancy checks, cryptographic hash function data, etc. Information for correcting errors may comprise error-correcting codes, forward error correction codes, and in particular, convolutional codes or block codes.

The symbols arranged in sequences are used to represent data conveying the set of information related to the capsule. For instance, each sequence may represent an integer number of bits. Each symbol may encode one or several binary bits. The data may also be represented by transitions between symbols. The symbols may be arranged in the sequence using a modulation scheme, for example a line coding like a Manchester coding.

Each symbol may be represented in the section by an entity having a measurable characteristic, readable by the measuring arrangement, the measurable characteristic varying according to the value conveyed by said symbol. Each symbol may be printed and/or embossed. The shape of the symbols may be chosen amongst the following non-exhaustive list: arch-shaped segments, segments which are individually rectilinear but extend along at least a part of the section, dots, polygons, geometric shapes. The symbols may be readable by an optical sensor included in the reading arrangement, the color and/or the shape of each symbol being chosen according to the value of said symbol. The symbols may be printed by an ink which is not visible by human eyes under natural light e.g., ink visible under UV. The symbols may be printed or embossed by a pattern which possesses surfaces having different reflective and/or absorbing properties to light. The pattern may possesses first surfaces having inclined mirroring or absorbing properties to light and second surfaces having flat mirroring or flat reflective properties to light. Other variable physical characteristics may be chosen to distinguish each symbol, for example the color, the reflectivity, the opacity, the light absorption level, the magnetic field, the induced magnetic field, the resistivity, the capacity, etc. For instance, the sequence can be composed with four different symbols coding respectively one of the four set of data '00', '01', '10', '11', each symbol having the shape of a dot or a square, and a black color or a 25% gray color. In this example, a black dot may code '00', a gray dot '01', a black square '10', a gray square to '11'.

In an embodiment, each sequence of symbols has a same fixed length, and more particularly has a fixed number of symbols. The structure of the sequence being known, it may ease the recognition of each sequence by the reading arrangement.

In an embodiment, at least one preamble symbol is represented in the section, so as to allow the determination of a start and/or a stop position in the section of each sequence. The preamble symbol is chosen to be identified separately from the other symbols. It may have a different shape and/or physical characteristics compared with the other symbols. Two adjacent sequences may have a common preamble symbol, representing the stop of one sequence and the start of the other one.

In an embodiment, at least one of the sequences comprises symbols defining a preamble sequence, so as to allow the determination of a position of the symbols in said sequence coding the set of information related to the capsule. The symbols defining a preamble may code a known reserved sequence of bits, for example '10101010'.

In an embodiment, the preamble symbols and/or the preamble sequences comprise information for authentifying the set of information, for example a hash code or a cryptographic signature.

In an embodiment, the support can be a part of the capsule itself. In particular, the support may be spread along the circumference or a part of the circumference of the capsule. The support can be further located close to the peripheral edge of the capsule, the peripheral edge being defined as the outermost circular line of the capsule. These locations are particularly advantageous since they offer both a large area for the symbols to be disposed and are less prone to damages caused by the processing module and in particular by the pyramidal plate, and to ingredients projections. As a consequence, the amount of coded information and the reliability of the readings are both improved.

The support can be part of, or be formed directly on, the body of the capsule. The support can also be disposed on the bottom side of the rim of the capsule. Typically, the distance of the support from the peripheral edge is not more than 10 mm, more preferably not more than 8 mm. In particular, the support can be made of a paint and/or a lacquer and/or an embossed ply of material of the capsule itself.

In an embodiment, the support can be a separate part adapted to be coupled in rotation with a capsule. For instance, the support can be a ring having a circumferential part on which the at least one sequence of symbols is represented, so as the user can positioned said ring on the circumference of the capsule before introducing it into the brewing unit of the beverage machine Consequently, a capsule without embedded means for storing information can be modified by mounting such a support so as to add such information. Depending on the configuration of the reading arrangement, the support can be positioned so as the section containing the sequence of symbols is spread along the circumference or a part of the circumference of the body of the capsule, or on the bottom side of the rim of the capsule. The support may be simply disposed relatively to the capsule without additional fixing means, the user ensuring that the support is correctly positioned when entering the brewing unit, or the forms and the dimensions of the support preventing it from moving relatively to the capsule once mounted. Alternatively, the support may comprise fixing means, like glue or mechanical means, to help the support staying fixed relatively to the capsule once mounted.

The symbols are spread along the circumference or a part of the circumference of the support. The code may comprise successive arch-shaped segments. The symbols may also comprise successive segments which are individually rectilinear but extend along at least a part of the circumference. According to one embodiment, the sensor cannot read the symbols without the rotation of the capsule. More particularly the sensor cannot read all the symbols included in each sequence without the rotation of the capsule. This is the case where the symbols are spread along at least a eighth, preferably at least a quarter of the circumference or even more. The fact that the symbols are placed along an arc-shaped line render the reading by a sweep beam very difficult. This is why the rotation of the capsule plays an important role. In case that the code is located on the body, it is then necessary to rotate the capsule to have access, for the sensor, to the entire set of symbols composing the sequence. The symbols are further located close to the peripheral edge of the capsule. The peripheral edge is defined as the outermost circular line of the capsule. Preferably, the distance of the code from the peripheral edge is not more than 10 mm, more preferably not more than 8 mm.

According to an embodiment, the symbols are printed by an ink which is not visible by human eyes under natural light (e.g., ink visible under UV). In this case, the sensor further comprises a UV-light beam source and a UV detector.

The sequence is preferably repeated along the circumference in order to ensure a reliable reading. The sequence is repeated at least twice on the circumference. Preferably, the sequence is repeated three to six times on the circumference. Repetition of the sequence means that the same sequence is duplicated and the successive sequences are positioned in series along the circumference so that upon a 360-degree rotation of the capsule, the same sequence can be detected or read more than one time.

EXAMPLES

Figure 3:
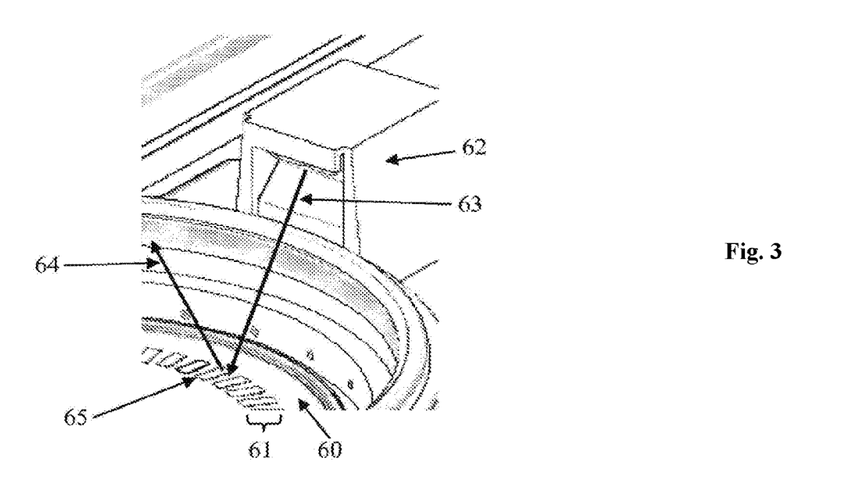
FIGS. 3, 4 illustrates a reading method of a symbol on the lid surface of the capsule.
Figure 4:
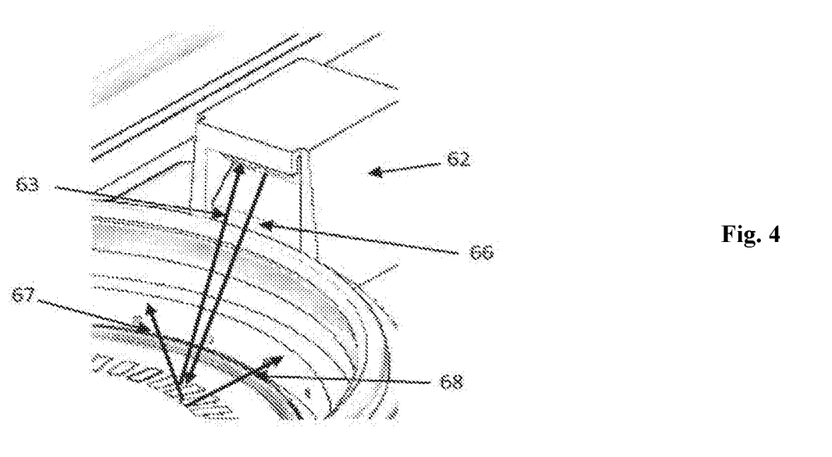

1) Optical Reading on Foil, Respectively on Top Side Rim of Capsule, with a Support Formed Directly on the Capsule (FIGS. 3 and 4):

A light beam is projected onto the capsule's lid, e.g., membrane or foil 60, as illustrated on FIG. 3.

Directly onto the capsule foil 60, a plurality of symbols forming the sequences 61 is applied along a circular or arc-shaped path.

Preferably, the support is placed or formed on a flat portion of the lid and close to the peripheral edge of the capsule. The support is preferably placed the lid that is supported by the flange-like rim of the capsule or overlaps with the rim. Hence, the support is not distorted due to mechanical constraints and the sequences can be read more reliably.

The symbols may be represented by:
Mirroring or absorbing surfaces, coding a binary value of "0" and,
Diffusing and reflective surfaces for coding a binary value of "1"

The values "0" and "1" are arbitrary chosen and can be inversed.

The sequence is read by rotating the capsule along a central axis A (FIG. 1).

The reader or sensor 62 is part of the centrifugal unit 2 and consists of
A light source with or without focusing optic and
A light sensor with or without focusing optic.
The light can be:
Non polarized or
Polarized (laser) or
Spectrum: Any, but preferably infra red.
The support can be formed on the capsule by:
Printing (absorbing/reflecting+diffusing), visible, invisible or
Embossing (mirroring+rough reflecting+diffusing) or
Laser engraving.

Optionally, the symbols may also be represented by different color patterns combined with a color reading device. The combination of different colors and reading at a specific rotational speed results in a well defined "mixed color". As an example, a capsule with half the circumference in blue and the other half in yellow would result in reading a green color during rotation. In the same manner, one third in blue and the remaining part in yellow will give another color. In this case, the light could by a simple light source without specific convergence means.

As illustrated in FIG. 3, when the light beam 63, sent by the light source of the sensor 62, touches one of the symbols 65 it reflects in a reflective beam 64 which is not received by the sensor.

As the capsule is rotated (FIG. 4), the light beam 63 touches another symbol represented by a diffuse reflecting surface (surface between the small rectangles) and is partially reflected to the sensor. A reflective beam 66 is received by the sensor whereas other beams 67, 68 are diffused or reflected outside the sensor.

2) Optical Reading on Rim Bottom Side of Capsule (FIGS. 5 to 8):

The capsule 7 may comprise a support mounted having at least one sequence 70, and mounted on the bottom side 72 of the rim 73 of the capsule. The symbols are represented by small rectangular surfaces having light mirroring properties and intermediate surfaces having flat mirroring and/or diffusing properties. The surfaces are arranged in a circular pattern or at least along an angular portion of the rim.

A light beam 74 is projected to the capsule's rim 73.

The symbols may be represented by:

Inclined mirroring or (flat) absorbing surfaces coding a binary value of "0" and Flat mirroring or flat reflective (diffusing) surfaces coding a binary value of "I". The sequence is read by rotating the capsule along its central axis A.

The reader may consist of

A light source with/without focusing optic and,

A light sensor with/without focusing optic.

The light can be:

Non polarized or

Polarized (laser) or

Spectrum: Any, but preferably infra red.

The code can be applied on the capsule by:

Printing (absorbing/reflecting+diffusing), visible, invisible or,

Laser engraving (e.g. for absorbing/reflecting-diffusing) surfaces or,

Embossing: Flat and inclined mirroring surfaces.

In the embodiment of the FIG. 5, the light source is placed at the bottom of the centrifugal cell 3. This cell is light conductive allowing the beam to reach the bottom side 72 of its rim 73. The reflected light is conducted by the transparent (or light conductive) centrifugal cell 3 to reach the sensor 62. In case that the sensor 62 cannot be aligned with the transparent part of the centrifugal cell 3, a mirror can be placed as illustrated in the FIG. 5 to deflect the forward and backward beams.

Figure 6:
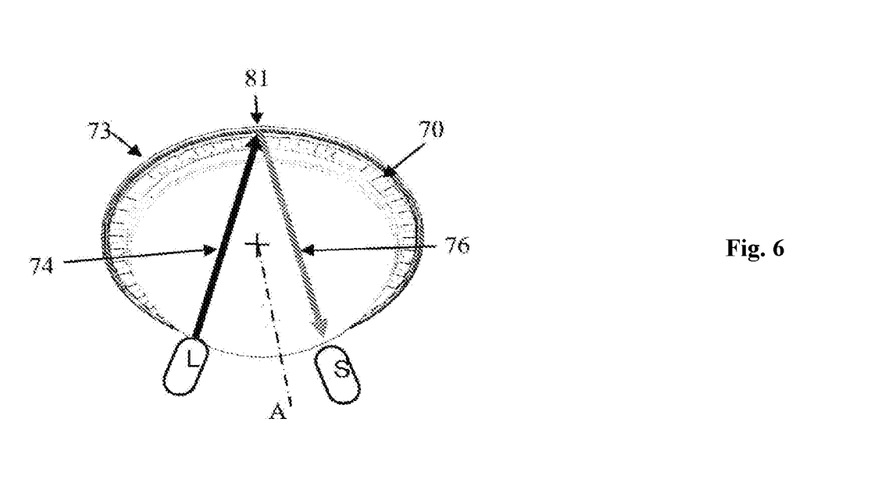
FIGS. 6 and 7 illustrate the combination of a laser source and a detector in positive and negative detection, for example, for the alternate position of the sequence of FIG. 5.

On FIG. 6, the light beam 74 from the light source "L" touches the mirror surface of the symbol 81 and is reflected into a reflective beam 76 to the sensor "S" with high intensity. A bit such as "0" or "1" is thereby provided to the control unit.

Figure 7:
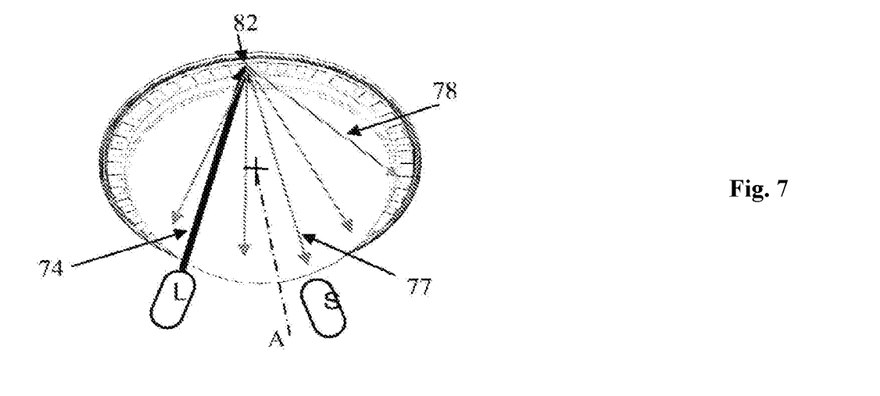
Figure 8:
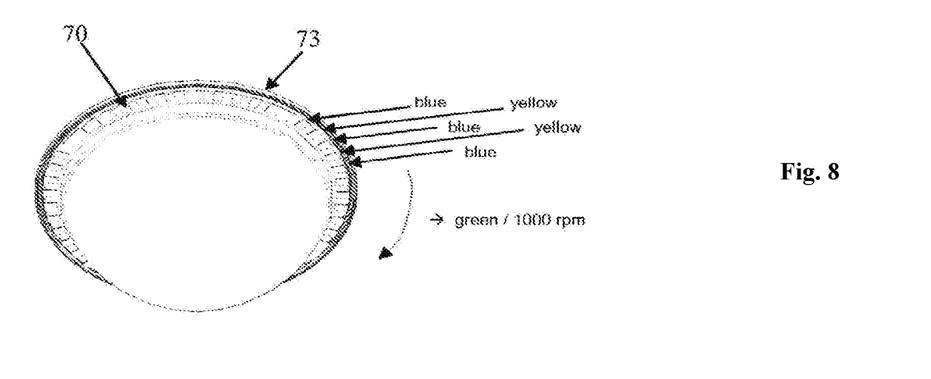
FIG. 8 illustrates the detection of a color symbol on the capsule, for example, for the alternate position of the sequence of FIG. 5.

On FIG. 7, the light beam 74 from the light source "L" touches diffusing or absorbing surfaces (symbol 82). The light beam 77 that reaches the sensor is of small intensity. Other beams such as beam 78 are diffused outside the sensor S due to the diffusing properties of the surface.

A bit such as "1" or "0" is provided to the control unit.

Therefore, the number of symbols depends on the number and specific arrangement of mirror surfaces (e.g. rectangles) and diffusing or absorbing surfaces (e.g., zones between the rectangles). The sequence can be repeated several times on the circumference of the rim. This repetition provides redundancy and more reliability to the reading.

Optionally (FIG. 8), the symbols are represented by different color patterns combined with a color reading device. The combination of different colors and reading at a specific rotational speed results in a well defined "mixed color". As an example, a capsule with half the "dots" in blue and the other half in yellow would result in reading a green color during rotation.

3) Mounting of the Support onto a Capsule

The support can be directly formed by different methods onto a capsule such as by:

Printing or mechanical deforming on a formed capsule or,

Printing or mechanical deforming on the capsule raw material (foil) before container forming or, Printing on outer surface of a capsule container or— Printing on the inner surface of a capsule container, using the curl as information support (Aluminum capsule technology). The support can also be a separate part adapted to be mounted/coupled in rotation with a capsule. The support can be positioned onto said ring on the circumference of the capsule before introducing it into the brewing unit of the beverage machine The support may be simply disposed relatively to the capsule without additional fixing means, the user ensuring that the support are correctly positioned when entering the brewing unit, or the forms and the dimensions of the support preventing it from moving relatively to the capsule once mounted. The support may also be mounted using fixing means, like glue or mechanical means, to help the support staying fixed relatively to the capsule once mounted.

4) Inductive Sequence Reading:

In another embodiment, the symbols provided on a metallic surface of the support are sensed using an inductive sensor. The symbols are formed by reliefs or recesses in the metallic surface. For instance, the support comprises a circumferential metal rim which comprises a succession of discrete slots and/or bumps. When the capsule is rotated about its central axis, the rim is moved relative to the sensor such that the slots and/or bumps are detected. The sequence can be read on a time base of a CPU of the beverage preparation device. The maximum rotational speed to read the sequence depends on the used sensor and the internal CPU of the device.

5) Other General Characteristics to All Embodiments:

The speed for reading can, for instance, be comprised between 0.1 and 1000 rpm.

When reading the sequence, liquid can already fed in the capsule for providing a pre-wetting of the beverage ingredients.

The invention is claimed as follows:

1. A capsule for the preparation of a beverage, the capsule comprising a container and a beverage ingredient contained therein, wherein the container comprises at least one support comprising a section on which a plurality of sequences of symbols is represented so that each symbol is sequentially readable, by a reading arrangement of an external device, while the capsule is rotated along an axis of rotation, each sequence coding a set of information related to the capsule, wherein at least one of the sequences comprises symbols defining a preamble sequence that allows determination of a position of the symbols in the associated sequence coding the set of information related to the capsule, the container comprising a cup-shaped body having a flange-like rim and a lid connected to the body, wherein the support is present on a bottom of the rim, and the bottom of the rim is opposed to the lid.

2. The capsule of claim 1, wherein the set of information of at least one of the sequences comprises information identifying a type associated to the capsule.

3. The capsule of claim 1, wherein the set of information of at least one of the sequences comprises information for detecting errors and/or for correcting errors in the set of information.

4. The capsule of claim 3, wherein the preamble symbols and/or the preamble sequences comprise information for authenticating the set of information.

5. The capsule of claim 1, wherein each symbol is represented in the section by an entity having a measurable characteristic readable by the measuring arrangement, the measurable characteristic varying according to the value conveyed by the symbol.

6. The capsule of claim 5, wherein each symbol is printed and/or embossed in the section of the support and/or is formed of one or a plurality of discrete polygonal or elliptical surfaces.

7. The capsule of claim 6, wherein the section of the support has a circumference, each symbol is represented in the section by a segment which is sensibly rectilinear and extends substantially along at least a part of the circumference.

8. The capsule of claim 5, wherein the symbols are readable by an optical sensor included in the reading arrangement, and the color and/or the shape of each symbol are chosen according the value of the symbol.

9. The capsule of claim 5, wherein the symbols are printed by an ink which is not visible by human eyes under natural light.

10. The capsule of claim 5, wherein the symbols are printed or embossed by a pattern which possesses surfaces having different reflective and/or absorbing properties to light.

11. The capsule of claim 10, wherein the pattern possesses first surfaces having inclined mirroring or absorbing properties to light and second surfaces having flat mirroring or flat reflective properties to light.

12. The capsule of claim 1, wherein the support is permanently attached or placed on the capsule or is removably connected to the capsule.

13. The capsule of claim 1, having a circumference, wherein the section is arranged on the container along an arc-shaped or circular path of the circumference.

14. The capsule of claim 13, wherein each sequence is arranged along at least an eighth of the circumference.

15. A system comprising a beverage preparation device and the capsule of claim 1, wherein the beverage preparation device is configured to prepare a beverage from the capsule and comprises (i) a capsule holding member configured to hold the capsule, (ii) a rotational drive member configured to drive the holding member and the capsule in rotation along the axis of rotation and (iii) a reading member arranged for reading the sequences of symbols in the section when the capsule is rotated along the axis.

16. The system of claim 15, wherein the reading member comprises a light emitter and a light sensor or an inductive sensor.

17. The system of claim 15, wherein the reading member is arranged to read the sequences on the rim of the capsule.

* * * * *